United States Patent
Lee

(10) Patent No.: US 10,428,796 B2
(45) Date of Patent: Oct. 1, 2019

(54) SYSTEMS AND METHODS FOR OPTIMIZING THE POWER GENERATED BY WIND TURBINES

(71) Applicant: The AES Corporation, Arlington, VA (US)

(72) Inventor: Tristan James Lee, Tuscola, TX (US)

(73) Assignee: THE AES CORPORATION, Arlington, VA (US)

(*) Notice: Subject to any disclaimer, the term of this patent is extended or adjusted under 35 U.S.C. 154(b) by 693 days.

(21) Appl. No.: 14/671,178

(22) Filed: Mar. 27, 2015

(65) Prior Publication Data
US 2016/0281682 A1     Sep. 29, 2016

(51) Int. Cl.
F03D 7/04     (2006.01)

(52) U.S. Cl.
CPC ........ F03D 7/043 (2013.01); *F05B 2270/806* (2013.01); *Y02E 10/723* (2013.01)

(58) Field of Classification Search
CPC ........ H05B 37/0272; G05B 2219/2619; H02P 2101/15; F03D 7/047; F03D 7/043
See application file for complete search history.

(56) References Cited

U.S. PATENT DOCUMENTS

| | | | | |
|---|---|---|---|---|
| 7,347,668 B2* | 3/2008 | Pedersen | ............... | F03D 7/0204 416/1 |
| 7,805,205 B2* | 9/2010 | Santos | .................. | F03D 7/0292 290/44 |
| 7,960,850 B2* | 6/2011 | Rasmussen | ............. | F03D 7/028 290/44 |
| 8,076,789 B2* | 12/2011 | Miller | ..................... | F03D 7/048 290/43 |
| 8,120,194 B2* | 2/2012 | Hoffmann | ................. | H02P 9/04 290/44 |

(Continued)

FOREIGN PATENT DOCUMENTS

CN     203465287 U  *  3/2014

OTHER PUBLICATIONS

GE Energy, "Ultrasonic Anemometers", Jul. 16, 2012, 8 pages.
G. Luff Mess, "Wind Meter Ventus V200A-UMB" Operating Manual. Document Version V10, Mar. 2013; 78 pages.

*Primary Examiner* — Justin D Seabe
(74) *Attorney, Agent, or Firm* — Buchanan Ingersoll & Rooney PC

(57) ABSTRACT

A method for controlling a wind turbine via an ultrasonic wind sensor includes: transmitting, by a first ultrasonic transceiver, an ultrasonic packet at a first time and receiving, by a second ultrasonic transceiver, the ultrasonic packet at a second time; identifying wind properties based on the first time and the second time; transmitting the identified wind properties to a programmable logic controller (PLC) interfaced with the wind sensor and a turbine controller, wherein the interface with the turbine controller includes one of a plurality of communication topologies; processing the identified wind properties for output to the turbine controller based on a specific communication topology, wherein the PLC is configured to process the identified wind properties for output based on each of the plurality of communication topologies; transmitting the processed wind properties to the turbine controller; and controlling, by the turbine controller, a wind turbine based on the wind properties.

19 Claims, 5 Drawing Sheets

(56) References Cited

U.S. PATENT DOCUMENTS

| | | | |
|---|---|---|---|
| 8,694,169 B2* | 4/2014 | Lovmand | F03D 7/047 290/44 |
| 2010/0133822 A1* | 6/2010 | Mixter, Jr. | F03D 7/047 290/44 |

* cited by examiner

SYSTEMS AND METHODS FOR OPTIMIZING THE POWER GENERATED BY WIND TURBINES

FIELD

The present disclosure relates to the optimization of wind turbine operation, specifically the use of a programmable logic controller interfaced with an ultrasonic sensor and wind turbine controller to optimize operation of the wind turbine based on wind properties.

BACKGROUND

The use of renewable energy sources to generate power is becoming a focus for all of humanity, as fossil fuels and other sources of power diminish. One type of renewable energy source that is sought after is the power of the wind. Wind turbines are being built across the world, which operate using wind, and generate power for use in power systems in a large number of countries. Because wind is renewable, and because the turbines themselves have little effect on the wind, power generated by the wind is considered to be very clean energy, particularly with respect to other potential power sources.

However, while wind energy may be clean and renewable, it can often be unreliable. The wind can blow at a wide range of speeds and in any direction at any given moment, if it blows at all. The efficiency of wind turbines is highly affected by the various properties of the wind, as well as the properties and operation of the wind turbine itself. For example, the positioning of the blades of a wind turbine with respect to the wind direction can have a significantly large effect on the power generated by the wind turbine. As a result, many wind turbines may have turbine controllers that adjust operation of the wind turbine based on properties of the local wind. In many instances, the wind properties are identified using mechanical sensors mounted on the wind turbine.

Unfortunately, existing turbine controllers and mechanical sensors can suffer from a number of problems. First, mechanical wind sensors can be highly susceptible to ice and are thus often only operable in warmer conditions, which may cause wind turbines to either be built away from colder climates, or may cause wind turbines in colder climates to lose efficiency due to malfunctioning and/or damaged sensors. Furthermore, in existing systems, the mechanical wind sensors are either directly interfaced, or interfaced electrically via a passive and/or active signal conditioner, with a wind turbine's turbine controller. However, because turbine controllers can vary from wind turbine to wind turbine, and because turbine controllers often operate using different wind properties and signal types, each installation may require special consideration and configuration. Such functions may require a significant expenditure of time and resources in order to set up the wind turbines. Furthermore, such systems may require additional servicing and repair times, as workers would need to be familiar with every possible type of interface between the controllers and the sensors.

Thus, there is a need for a technical system for operation of a wind turbine that avoids using problematic mechanical wind sensors, and that is interchangeable between various turbine controllers, in order to minimize setup and maintenance costs, while maintaining a higher level of optimization in wind turbine operation.

SUMMARY

The present disclosure provides a description of systems and methods for controlling wind turbines via ultrasonic wind sensors.

A method for controlling a wind turbine via an ultrasonic wind sensor includes: transmitting, by a first ultrasonic transceiver of a wind sensor, an ultrasonic packet at a first time and receiving, by a second ultrasonic transceiver of the wind sensor, the ultrasonic packet at a second time; identifying, by a processing device of the wind sensor, one or more wind properties based on at least the first time and the second time; transmitting, by a transmitting device of the wind sensor, the identified one or more wind properties to a programmable logic controller (PLC) interfaced with the wind sensor and a turbine controller, wherein an interface between the PLC and the turbine controller includes a specific communication topology of a plurality of communication topologies; processing, by a processing device of the PLC, the identified one or more wind properties for output to the turbine controller based on the specific communication topology, wherein the processing device of the PLC is configured to process the identified one or more wind properties for output based on each of the plurality of communication topologies; transmitting, by a transmitting device of the PLC, the processed one or more wind properties to the turbine controller via the interface between the PLC and the turbine controller; and controlling, by the turbine controller, a wind turbine based on at least the processed one or more wind properties.

A system for controlling a wind turbine via an ultrasonic wind sensor includes: a first ultrasonic transceiver of a wind sensor configured to transmit an ultrasonic packet at a first time; a second ultrasonic transceiver of the wind sensor configured to receive the ultrasonic packet at a second time; a processing device of the wind sensor configured to identify one or more wind properties based on at least the first time and the second time; a transmitting device of the wind sensor configured to transmit the identified one or more wind properties to a programmable logic controller (PLC) interfaced with the wind sensor and a turbine controller, wherein an interface between the PLC and the turbine controller includes a specific communication topology of a plurality of communication topologies; a processing device of the PLC configured to process the identified one or more wind properties for output to the turbine controller based on the specific communication topology, wherein the processing device of the PLC is configured to process the identified one or more wind properties for output based on each of the plurality of communication topologies; a transmitting device of the PLC configured to transmit the processed one or more wind properties to the turbine controller via the interface between the PLC and the turbine controller; and a processing device of the turbine controller configured to control a wind turbine based on at least the processed one or more wind properties.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Operating a Wind Turbine

Figure 1:
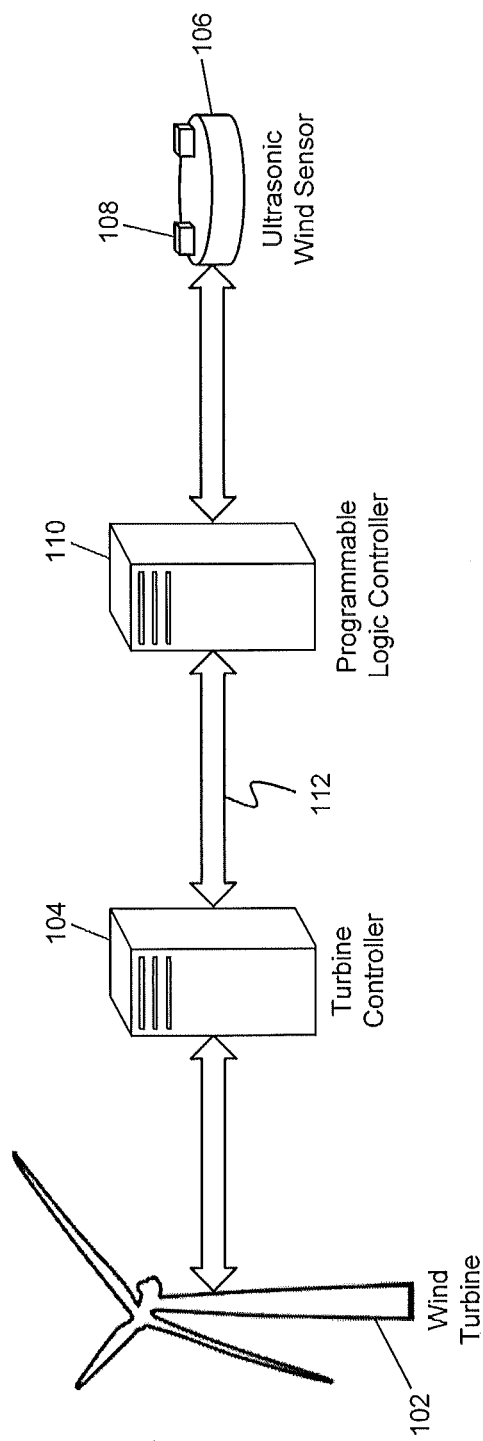
FIG. 1 is a block diagram illustrating a high level system architecture for operating a wind turbine in connection with an ultrasonic wind sensor in accordance with exemplary embodiments.

FIG. 1 illustrates a system 100 for the operation of a wind turbine via an ultrasonic wind sensor.

The system 100 may include a wind turbine 102. The wind turbine 102 may be a wind turbine, which may be any type of wind turbine configured to generate electrical power that operates using wind as a power source. The wind turbine 102 may be of any manufacture and configuration without regard for the methods and systems discussed herein. That is to say, the wind turbine 102 may not be of a special manufacture or configuration that is designed to operate in the system 100, but may be any type of wind turbine 102, such as a legacy wind turbine, and may operate in the system 100 as a result of the methods and systems discussed herein.

The wind turbine 102 may include a turbine controller 104. The turbine controller 104 may be a type of computing device configured to operate the wind turbine 102. The turbine controller 104 may operate based on one or more wind properties of wind that is local to the wind turbine 102. For example, the turbine controller 104 may operate the wind turbine 102 based on wind speed, wind direction, temperature, humidity, barometric pressure, air density, etc. The turbine controller 104 may, for instance, adjust the orientation of the wind turbine 102, resistance of blades of the wind turbine 102, etc. The configuration and operation of turbine controllers 104 will be apparent to persons having skill in the relevant art.

In the system 100, wind properties may be measured via an ultrasonic wind sensor 106. The ultrasonic wind sensor 106 may include an even number of ultrasonic transceivers 108. Each pair of ultrasonic transceivers 108 may be configured to measure one or more wind properties via the use of ultrasonic packets. A first ultrasonic transceiver 108 may transmit an ultrasonic packet to a second ultrasonic transceiver 108 in the ultrasonic wind sensor 106. Based on a time of receipt of the ultrasonic packet, the ultrasonic wind sensor 106 may calculate one or more wind properties. For example, wind speed may be calculated based on an expected transmission time of an ultrasonic packet (e.g., in the absence of wind) and an actual transmission time of the ultrasonic packet, where delay in the transmission time is a result of wind experienced by the ultrasonic packet.

In some embodiments, the ultrasonic wind sensor 106 may include a plurality of pairs of ultrasonic transceivers 108. In such embodiments, ultrasonic packets may be transmitted between pairs of ultrasonic transceivers 108, with wind properties calculated by the ultrasonic wind sensor 106 based on the transmission times of the ultrasonic packets transmitted between each of the pairs of ultrasonic transceivers 108. For example, wind direction may be calculated based on a difference in transmission time between pairs of ultrasonic transceivers 108 and based on the directional orientation of the ultrasonic transceiver 108 pairs. Algorithms used for the calculation of wind properties based on ultrasonic packet transmission times and orientations will be apparent to persons having skill in the relevant art.

Wind properties measured and calculated by the ultrasonic wind sensor 106 may be transmitted to a programmable logic controller (PLC) 110 interfaced with the ultrasonic wind sensor 106. In some embodiments, the interface may be a physical interface. The PLC 110, discussed in more detail below, may be configured to format the received wind properties for transmission to the turbine controller 104. The PLC 110 may be interfaced with the turbine controller 104 using a communication topology 112. The communication topology 112 may be one of a plurality of communication topologies. In some instances, the interface between the PLC 110 and the turbine controller 104 may be a physical interface. The PLC 110 may be configured to format wind properties for transmission to a turbine controller 104 using any of the plurality of communication topologies. As a result, the PLC 110, when interfaced between an ultrasonic wind sensor 106 and turbine controller 104, may be configured to provide wind properties to the turbine controller 104 regardless of the manufacture or configuration of the turbine controller 104. Therefore, the PLC 110 may provide for the control of any wind turbine 102 via wind measured using the ultrasonic wind sensor 106.

Figure 4:
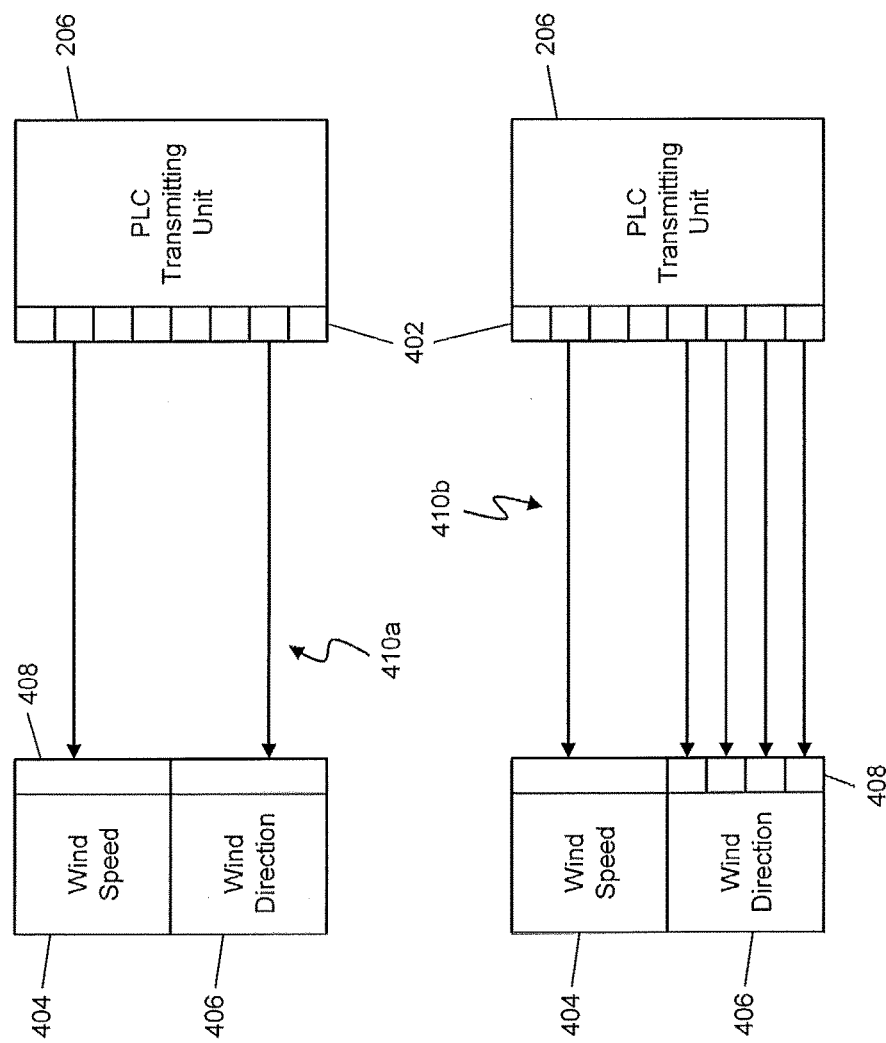
FIG. 4 is a diagram illustrating the use of various communication topologies between a programmable logic controller and turbine controller in accordance with exemplary embodiments.

In some embodiments, the PLC 110 may be configured to identify the communication topology 112. The communication topology 112 may include the wind properties that are to be transmitted to the turbine controller 104, communication channels between the PLC 110 and the turbine controller 104, and the data that is to be transmitted using the communication channels. For instance, as illustrated in FIG. 4 and discussed in more detail below, a first turbine controller 104 may operate using wind speed and wind direction, and may receive wind direction via four separate channels of communication to indicate the wind direction, whereas a second turbine controller 104 may operate using wind speed and wind direction with only a single channel of communication used to indicate wind direction. The PLC 110 may be configured to identify the communication topology 112 between the PLC 110 and the turbine controller 104 and format the wind properties received from the ultrasonic wind sensor 106 for transmission to the turbine controller 104 accordingly.

In some instances, the PLC 110 may use jumpers to identify the communication topology 112. For example, a jumper may be placed on one or more pins of the PLC 110 based on the wind property inputs and/or input channels of the turbine controller 104. The PLC 110 may thereby format the wind properties for transmission to the turbine controller 104 based on positions of jumpers. For instance, a first position may indicate that wind direction is to be transmitted using a single channel, while a second position may indicate that wind direction is to be transmitted using four channels. In some embodiments, a single jumper may be used to indicate the communication topology 112 with respect to all wind properties. In other embodiments, a separate jumper may be used for each wind property.

By being programmed for use in a plurality of communication topologies 112, the PLC 110 may be configured to provide wind properties measured by an ultrasonic wind sensor 106 to any turbine controller 104 used to operate any wind turbine 102 regardless of manufacture or configuration. As a result, the PLC 110 may be installed in any wind turbine 102 to enable optimal control and operation of the wind turbine 102 via the ultrasonic wind sensor 106. This may enable energy providers to more efficiently operate their wind turbines 102, without regard for manufacture and configuration of the wind turbines 102, particularly in instances where multiple types of wind turbines 102 are used. Furthermore, because the PLC 110 may be used in each type of wind turbine 102, the time and expenses necessary for maintenance and repair of wind turbines 102 may be reduced over traditional systems. Therefore, the systems and methods discussed herein may provide a significant number of technical improvements over existing systems of control of wind turbines 102.

In some embodiments, the PLC 110 may be further configured to adjust wind properties based on an offline or online status of the wind turbine 102. For example, the PLC 110 may be configured to receive one or more signals from the turbine controller 104 via the communication topology 112, which may be indicative of an offline or online status of the wind turbine 102. The one or more signals may themselves provide an indication of online or offline status, or may provide data that may be used by the PLC 110 in determination online or offline status of the wind turbine 102. For instance, the one or more signals may include data regarding power generated by a generator connected to the wind turbine 102, connection status of a network including the wind turbine 102 to an external network, turbine controller settings, or other information suitable for determining online or offline status of the wind turbine 102 that will be apparent to persons having skill in the relevant art.

The PLC 110 may then adjust the processed wind properties (e.g., subsequent to, during, or prior to the processing for transmission to the turbine controller 104) based on the status of the wind turbine 102. For example, the turbine controller 104 may be configured to adjust wind speed due to effects of operation of the wind turbine 102, regardless of the operational status of the wind turbine 102. However, the wind turbine 102 may not affect the wind speed when not in operation, and as a result, the turbine controller 104 may perform the adjustment and modify the wind speed away from the true value. In such an instance, the PLC 110 may be configured to counter the adjustment of the turbine controller 104 if the wind turbine 102 is in offline status, so that the wind speed, once adjusted by the turbine controller 104, is the true wind speed. Such a modification may be beneficial when the true wind speed should be measured by the wind turbine 102 even when offline, such as in instances where an entity operating the wind turbine 102 may receive funding based on wind properties even if the wind turbine 102 is not in operation.

Accordingly, by using the PLC 110 and incorporating the offline or online status of the wind turbine 102, the PLC 110 may provide for more accurate measuring of wind properties by use of the turbine controller 104, even when the wind turbine 102 is not in operation. As a result, the PLC 110, when used in the methods and systems discussed herein, may provide for an even greater increase in revenue due to the more accurate reporting of the wind speed, in addition to the other benefits of the methods and systems herein as discussed above.

Programmable Logic Controller

Figure 2:
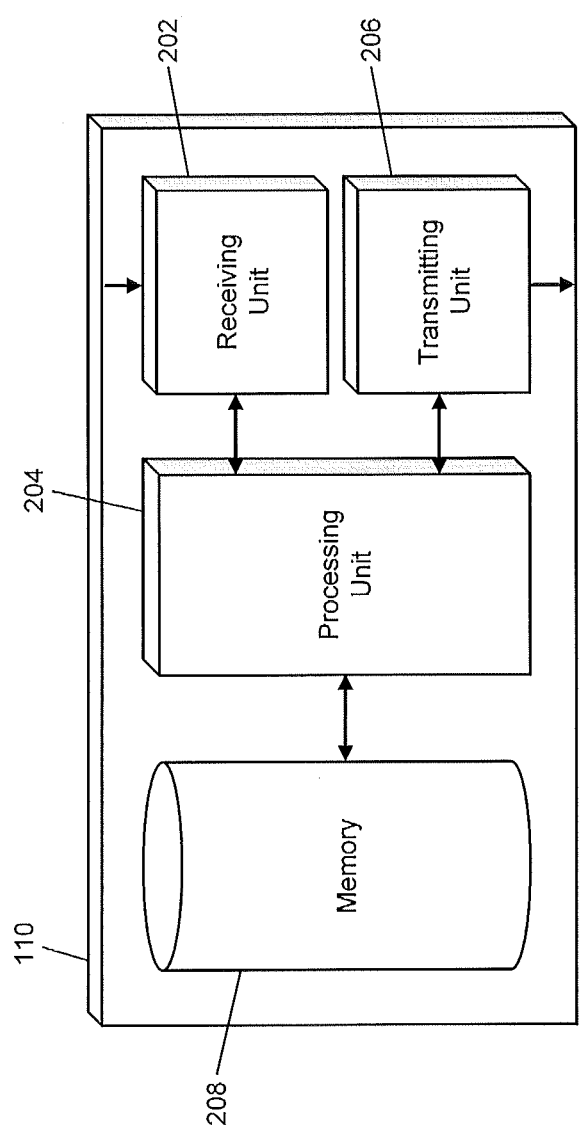
FIG. 2 is a block diagram illustrating the programmable logic controller of FIG. 1 for providing properly formatted wind properties to a turbine controller in accordance with exemplary embodiments.

FIG. 2 illustrates an embodiment of the PLC 110 of the system 100. It will be apparent to persons having skill in the relevant art that the embodiment of the PLC 110 illustrated in FIG. 2 is provided as illustration only and may not be exhaustive to all possible configurations of the PLC 110 suitable for performing the functions as discussed herein. For example, the PLC 110 may further include display units, additional memories, input devices, and any other component that may be suitable for use in performing the functions disclosed herein and any additional functions of a PLC.

The PLC 110 may include a receiving unit 202. The receiving unit 202 may be configured to receive data over one or more interfaces via one or more protocols. For example, the receiving unit 202 may be configured to receive wind property data from the ultrasonic wind sensor 106. The wind property data may include data indicative of wind speed, wind direction, temperature, humidity, barometric pressure, air density, etc. as measured using the ultrasonic transceivers 108. The receiving unit 202 may also be configured to receive data from the turbine controller 104, such as a request for wind properties via the communication topology 112, and one or more signals indicative of an offline or online status of the wind turbine 102.

The PLC 110 may also include a processing unit 204. The processing unit 204 may be configured to perform the functions of the PLC 110 discussed herein as will be apparent to persons having skill in the relevant art. The PLC 110 may be configured to format the received wind properties for transmission to the turbine controller 104 for operation of the wind turbine 102. In some embodiments, the PLC 110 may also be configured to calculate one or more wind properties based on the wind property data received from the ultrasonic wind sensor 106. For example, in some instances the ultrasonic wind sensor 106 may provide raw data to the PLC 110. In another example, the ultrasonic wind sensor 106 may provide some wind properties to the PLC 110, and the processing unit 204 may calculate additional wind properties, such as air density.

In some embodiments, the processing unit 204 may be further configured to adjust the wind properties based on an offline or online status of the wind turbine 102. The adjustment may be based on one or more signals received from the turbine controller 104 via the receiving unit 202 using the communication topology 112. In some instances, the processing unit 204 may also be configured to identify an offline or online status of the wind turbine using data included in the received signals. For example, the signals may include an output value of output of a generator connected to the wind turbine 102, and the processing unit 204 may determine the status of the wind turbine 102 based on the generator's output value.

The processing unit 204 may be configured to identify the communication topology 112 of the interface between the PLC 110 and the turbine controller 104. The communication topology 112 may be identified based on communication channels connected between the PLC 110 and the turbine controller 104, jumper positions on pins of the PLC 110, programming of the processing unit 204, and other suitable methods. The processing unit 204 may format the wind properties for transmission to the turbine controller 104 based on the identified communication topology 112. For example, the processing unit 204 may format wind direction for transmission using four communication channels as required by the communication topology 112. The processing unit 204 may be configured to format the wind properties for use of a plurality of different communication topologies 112, such that if the PLC 110 were connected to a different turbine controller 104 using a different communication topology 112, or if the communication topology 112 were changed, the processing unit 204 may format the wind properties according to the changed communication topology 112.

The PLC 110 may also include a transmitting unit 206. The transmitting unit 206 may be configured to transmit data one or more interfaces using one or more protocols. The transmitting unit 206 may be configured to transmit the wind properties to the turbine controller 104 via the communication topology 112. The transmitting unit 206 may also be configured to transmit additional data, such as requests for wind data to the ultrasonic wind sensor 106, requests for data to the turbine controller 104, such as a request for communication topology 112 information.

The PLC 110 may further include a memory 208. The memory 208 may be configured to store data suitable for use in performing the functions of the PLC 110 discussed herein. For example, the memory 208 may store rules or algorithms for calculating wind properties, for identifying communication topologies 112, for formatting wind properties based on communication topologies 112, for transmitting wind properties, etc. In some embodiments, the memory 208 may include ladder logic programming for use in operation of the PLC 110 via the processing unit 204. Additional data that may be stored in the memory 208 will be apparent to persons having skill in the relevant art. In some instances, the memory 208 may be a non-transitory computer readable recording medium. In some embodiments, the memory 208 may be comprised of a combination of random access, read-only, and other types of memory. The memory 208 may also be internal to or external from the PLC 110.

The PLC 110 may include any additional components suitable for performing the traditional functions of a PLC 110, or any additional functions as may be desired. For example, the PLC 110 may include a display interface for the display of data to a user, an input interface for the input of data by a user, etc. In another example, the PLC 110 may also include one or more interfaces for the interfacing to additional components that may be internal to or external from the PLC 110, such as additional memory, additional processing units, etc.

As will be apparent to persons having skill in the relevant art, additional components of the system 100 may also be configured to include the components of the PLC 110 illustrated in FIG. 2 and discussed herein. For example, the ultrasonic wind sensor 106 may include a receiving unit configured to receive data, such as a request for wind data from the PLC 110, a processing unit configured to perform functions of the ultrasonic wind sensor 106, such as the calculation of wind properties based on ultrasonic transceiver packet transmission times, a transmitting unit configured to transmit data, such as calculated wind properties to the PLC 110, and a memory, such as for the storage of rules or algorithms for the calculation of wind properties. In another example, the turbine controller 104 may include a receiving unit configured to receive data, such as wind properties from the PLC 110 using the communication topology 112, a processing unit for performing functions of the turbine controller 104, such as control of the wind turbine 102 based on the wind properties, a transmitting unit configured to transmit data, such as transmitting control signals to the wind turbine 102 and requests for wind properties to the PLC 110, and a memory 208, such as to store rules and algorithms for the control of the wind turbine 102.

Process for Control of a Wind Turbine

Figure 3:
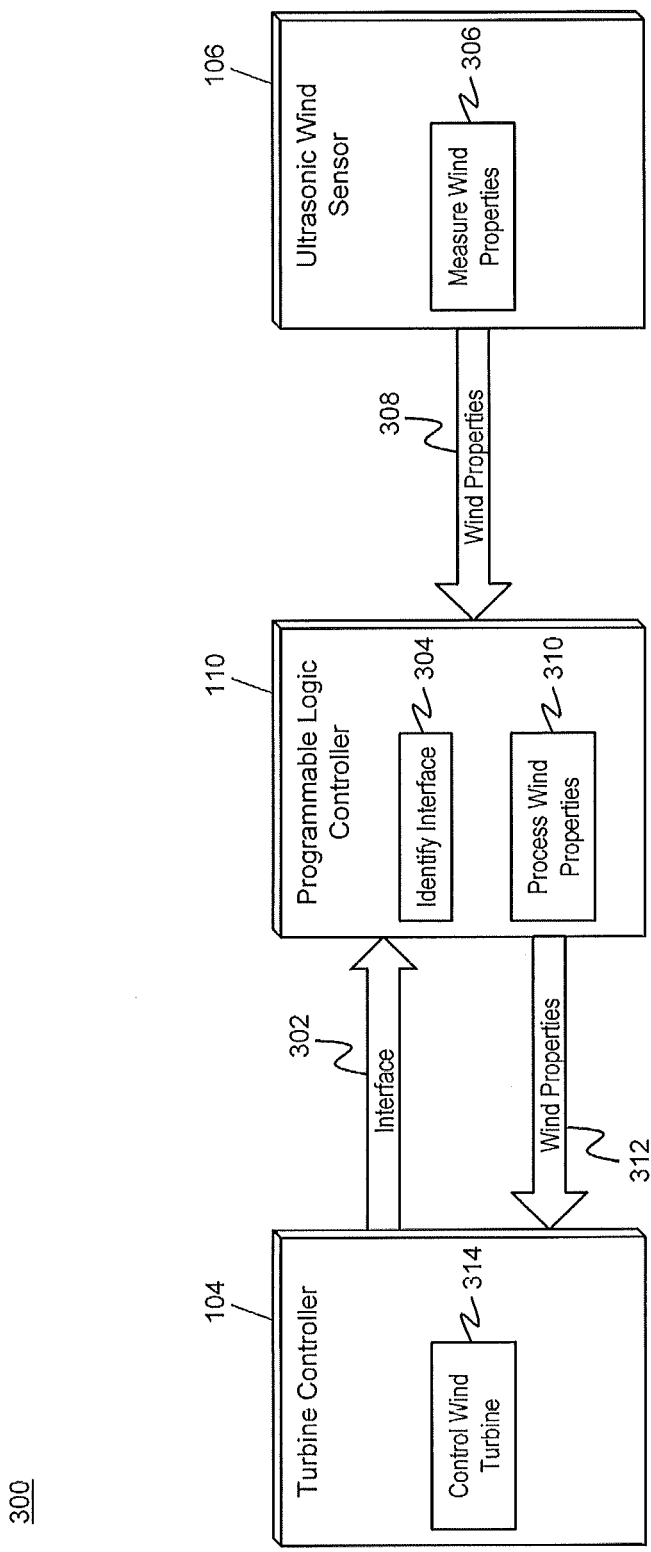
FIG. 3 is a flow diagram illustrating a process for operating a wind turbine via an ultrasonic wind sensor using the system of FIG. 1 in accordance with exemplary embodiments.

FIG. 3 illustrates a process 300 for the control of a wind turbine 102 in the system 100 using the PLC 110 and based on wind properties measured using the ultrasonic wind sensor 106.

In step 302, the turbine controller 104 may be interfaced with the PLC 110 using a communication topology 112. The communication topology 112 may be one of a plurality of communication topologies 112 and may indicate one or more signal types for use in the transmission of one or more wind properties using one or more channels. In step 304, the processing unit 204 of the PLC 110 may identify the communication topology 112 used in the interface with the turbine controller 104. The communication topology 112 may be identified, for example, based on input and/or output connections, jumper positions, ladder logic programming, etc.

In step 306, the ultrasonic wind sensor 106 may measure one or more wind properties. The wind properties may be measured based on transmission times for ultrasonic packets transmitted between pairs of ultrasonic transceivers 108 positioned on the ultrasonic wind sensor 106. The wind properties may be calculated by a processing unit of the ultrasonic wind sensor 106 based on the transmission times. In step 308, the wind properties may be transmitted to the PLC 110 by a transmitting unit of the ultrasonic wind sensor 106 and received via the receiving unit 202 of the PLC 110.

In step 310, the processing unit 204 of the PLC 110 may process the wind properties received from the ultrasonic wind sensor 106. Processing of the wind properties may include calculating any wind properties requested by the turbine controller 104 and formatting wind properties pursuant to the communication topology 112 of the interface between the turbine controller 104 and the PLC 110. For example, the processing unit 204 of the PLC 110 may format the wind direction to be a specified number of channels and of a specific signal type based on the communication topology 112. For instance, the wind direction may be comprised of four channels, each of which is associated with a directional quadrant and has a value indicated using a variable frequency square wave.

In step 312, the transmitting unit 206 of the PLC 110 may transmit the wind properties to the turbine controller 104 via the interface using the communication topology 112. In step 314, the turbine controller 104 may control the wind turbine 102 based on the received wind properties. For example, the turbine controller 104 may adjust the orientation of the blades of the wind turbine 102 based on the wind direction, may adjust the resistance of the blades based on the wind speed and air density, etc.

Communication Topologies

FIG. 4 illustrates the use of varying communication topologies 112 between the turbine controller 104 and PLC 110 in the system 100 for the control of a wind turbine 102 via an ultrasonic wind sensor 106.

The transmitting unit 206 of the PLC 110 may include a plurality of output channels 402. Each output channel may be configured to output data to the turbine controller 104. The output data may be transmitted in one of a plurality of signal types, and may be indicate one of a plurality of wind properties or portion thereof. For example, the data may be transmitted as voltage or current, as a square wave or triangle wave, may use pulse width modulation, may be transmitted via a transistor or replay, etc., and may indicate at least a portion of data associated with wind speed, wind direction, temperature, humidity, barometric pressure, air density, etc.

The turbine controller 104 (e.g., or a receiving unit thereof) may have a plurality of input channels 408. Each input channel 408 may be configured to receive input for a specific wind property, such as wind speed 404 and wind direction 406. The wind speed 404 and wind direction 406 may each be associated with one or more input channels 408. The associated input channels 408 may be connected to a corresponding output channel 402 of the transmitting unit 206 of the PLC 110. Connections among the channels may comprise a topology 410, which may be the communication topology 112 used in the interface between the PLC 110 and the turbine controller 104 as discussed herein.

As illustrated in FIG. 4, a first communication topology 410a may comprise of two single-channel connections between the PLC 110 and the turbine controller 104. In the communication topology 410a, the wind speed 404 and wind direction 406 inputs of the turbine controller 104 may each be associated with a single input channel 408. A second communication topology 410b may comprise of a single-channel connection between the PLC 110 and the turbine controller 104 for the transmission of wind speed, but a four-channel connection for the transmission of wind direction. As illustrated in FIG. 4, the wind direction input 406 of the turbine controller 104 may be associated with four input channels 408. As a result, four output channels 402 of the transmitting unit 206 of the PLC 110 may be used to transmit the wind direction to the turbine controller 104, and the processing unit 204 of the PLC 110 may format the wind direction for transmission accordingly.

It will be apparent to persons having skill in the relevant art that the communication topologies 410 illustrated in FIG. 4 and discussed herein are provided as an illustration only, and that additional and/or alternative topologies may be used. For example, a communication topology 410 for use as the communication topology 112 between the turbine controller 104 and the PLC 110 may include additional and/or alternative communication channels, transmit additional wind properties, use varying signal types, etc. In another example, a communication topology 410 may include one or more additional signals for transmitting data from the turbine controller to the PLC 110 that are indicative of an offline or online status of the wind turbine 102.

Exemplary Method for Controlling a Wind Turbine

Figure 5:
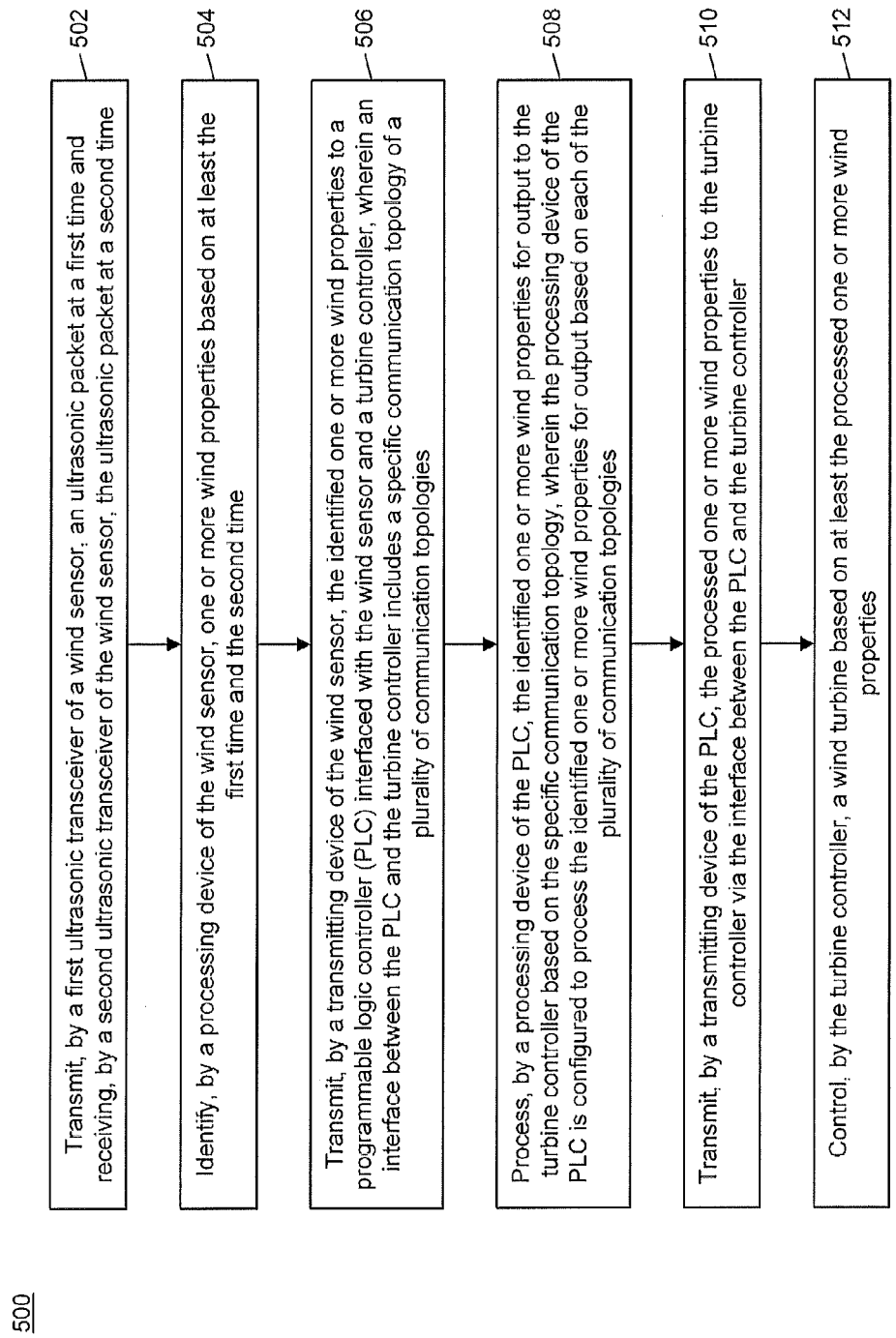
FIG. 5 is a flow chart illustrating an exemplary method for controlling a wind turbine via an ultrasonic wind sensor in accordance with exemplary embodiments.

FIG. 5 illustrates a method 500 for controlling a wind turbine via an ultrasonic wind sensor.

In step 502, an ultrasonic packet may be transmitted by a first ultrasonic transceiver (e.g., ultrasonic transceiver 108) of a wind sensor (e.g., ultrasonic wind sensor 106) at a first time and received, by a second ultrasonic transceiver 108 of the wind sensor 106 at a second time. In step 504, a processing device of the wind sensor 106 may identify one or more wind properties based on at least the first time and the second time. In one embodiment, the one or more wind properties may include at least one of: wind speed, wind direction, humidity, temperature, barometric pressure, and air density.

In step 506, the identified one or more wind properties may be transmitted by a transmitting device of the wind sensor 106 to a programmable logic controller (PLC) (e.g., the PLC 110) interfaced with the wind sensor 106 and a turbine controller (e.g., the turbine controller 104), wherein an interface between the PLC 110 and the turbine controller 104 includes a specific communication topology (e.g., the communication topology 112) of a plurality of communication topologies. In one embodiment, the interface between the wind sensor 106 and the PLC 110 may be a physical interface. In some embodiments, the interface between the PLC 110 and the turbine controller 104 may be a physical interface. In one embodiment, the specific communication topology 112 may include at least one or more first channels configured to transmit a first wind property and one or more second channels configured to transmit a second wind property. In some embodiments, the specific communication topology 112 may indicate a signal type associated with each of the one or more wind properties.

In step 508, the identified one or more wind properties may be processed by a processing device (e.g., the processing unit 204) of the PLC 110 for output to the turbine controller 104 based on the specific communication topology 112, wherein the processing device 204 of the PLC 110 is configured to process the identified one or more wind properties for output based on each of the plurality of communication topologies.

In step 510, the processed one or more wind properties may be transmitted by a transmitting device (e.g., the transmitting unit 206) of the PLC 110 to the turbine controller 104 via the interface between the PLC 110 and the turbine controller 104. In step 512, a wind turbine (e.g., the wind turbine 102) may be controlled by the turbine controller 104 based on at least the processed one or more wind properties.

In one embodiment, the method 500 may further include transmitting, by a third ultrasonic transceiver 108 of the wind sensor 106, a second ultrasonic packet at a third time and receiving, by a fourth ultrasonic transceiver 108 of the wind sensor 106, the second ultrasonic packet at a fourth time, wherein the third and fourth ultrasonic transceivers 108 are positioned perpendicular to the first and second ultrasonic transceivers 108, and the one or more wind properties are further based on the third time and the fourth time. In some embodiments, the method 500 may also include identifying, by the processing device 204 of the PLC 110, the specific communication topology 112 based on the interface between the PLC 110 and the turbine controller 104.

In one embodiment, the method 500 may further include receiving, by a receiving device (e.g., the receiving unit 202) of the PLC 110, the one or more wind properties transmitted by the transmitting device of the wind sensor 106 via an interface between the wind sensor 106 and the PLC 110. In some embodiments, the method 500 may also include receiving, by a receiving device of the turbine controller 104, the one or more wind properties transmitted by the PLC 110 via the interface between the PLC 110 and the turbine controller 104.

In one embodiment, the method 500 may further include: receiving, by a receiving device 202 of the PLC 110, one or more signals from the turbine controller 104 via the interface between the PLC and the turbine controller 104, wherein the one or more signals are indicative of an online or offline status of the wind turbine 102; and modifying, by the processing device 204 of the PLC 110, the processed one or more wind properties based on the received one or more signals prior to transmission to the turbine controller 104.

Techniques consistent with the present disclosure provide, among other features, systems and methods for controlling wind turbines via ultrasonic wind sensors. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for controlling a wind turbine via an ultrasonic wind sensor, comprising:
   transmitting, by a first ultrasonic transceiver of the wind sensor, an ultrasonic packet at a first time and receiving, by a second ultrasonic transceiver of the wind sensor, the ultrasonic packet at a second time;
   identifying, by a processing device of the wind sensor, one or more wind properties based on at least the first time and the second time;
   transmitting, by a transmitting device of the wind sensor, the identified one or more wind properties to a programmable logic controller (PLC) interfaced with the wind sensor and a turbine controller, wherein a physical interface between the PLC and the turbine controller includes a specific communication topology of a plurality of communication topologies;
   identifying, by the processing device of the PLC, the specific communication topology based on a type of the physical interface between the PLC and the turbine controller;
   processing, by a processing device of the PLC, the identified one or more wind properties for output to the turbine controller based on the specific communication topology, wherein the processing includes converting the identified one or more wind properties to a format suitable for output to the turbine controller according to the identified communication topology of the plurality of communication topologies;
   transmitting, by a transmitting device of the PLC, the converted one or more wind properties to the turbine controller via the interface between the PLC and the turbine controller; and
   controlling, by the turbine controller, a wind turbine based on at least the processed one or more wind properties received from the PLC.

2. The method of claim 1, wherein the one or more wind properties includes at least one of: wind speed, wind direction, humidity, temperature, barometric pressure, and air density.

3. The method of claim 1, further comprising:
   transmitting, by a third ultrasonic transceiver of the wind sensor, a second ultrasonic packet at a third time and receiving, by a fourth ultrasonic transceiver of the wind sensor, the second ultrasonic packet at a fourth time, wherein
   the third and fourth ultrasonic transceivers are positioned perpendicular to the first and second ultrasonic transceivers, and
   the one or more wind properties are further based on the third time and the fourth time.

4. The method of claim 1, wherein an interface between the wind sensor and the PLC is a physical interface.

5. The method of claim 1, wherein the specific communication topology includes at least one or more first channels configured to transmit a first wind property and one or more second channels configured to transmit a second wind property.

6. The method of claim 1, wherein the specific communication topology indicates a signal type associated with each of the one or more wind properties.

7. The method of claim 1, further comprising:
   receiving, by a receiving device of the PLC, the one or more wind properties transmitted by the transmitting device of the wind sensor via an interface between the wind sensor and the PLC.

8. The method of claim 1, further comprising:
   receiving, by a receiving device of the turbine controller, the one or more wind properties transmitted by the PLC via the physical interface between the PLC and the turbine controller.

9. The method of claim 1, further comprising:
   receiving, by a receiving device of the PLC, one or more signals from the turbine controller via the physical interface between the PLC and the turbine controller, wherein the one or more signals are indicative of an online or offline status of the wind turbine; and
   modifying, by the processing device of the PLC, the processed one or more wind properties based on the received one or more signals prior to transmission to the turbine controller.

10. The method of claim 1, further comprising:
    identifying, by the processing device of the PLC, the specific communication topology based on input and/or output connections of the turbine controller.

11. A system for controlling a wind turbine via an ultrasonic wind sensor, comprising:
    a first ultrasonic transceiver of the wind sensor configured to transmit an ultrasonic packet at a first time;
    a second ultrasonic transceiver of the wind sensor configured to receive the ultrasonic packet at a second time;
    a processing device of the wind sensor configured to identify one or more wind properties based on at least the first time and the second time;
    a transmitting device of the wind sensor configured to transmit the identified one or more wind properties to a programmable logic controller (PLC) interfaced with the wind sensor and a turbine controller, wherein a physical interface between the PLC and the turbine controller includes a specific communication topology of a plurality of communication topologies;
    a processing device of the PLC configured to process the identified one or more wind properties for output to the turbine controller based on the specific communication topology, wherein the processing device of the PLC is configured to identify the specific communication topology based on a type of the physical interface between the PLC and the turbine controller, and the processing device of the PLC is configured to convert the identified one or more wind properties for output based on the specific communication topology of between the PLC and the turbine controller;
    a transmitting device of the PLC configured to transmit the converted one or more wind properties to the turbine controller via the interface between the PLC and the turbine controller; and
    a processing device of the turbine controller configured to control a wind turbine based on at least the one or more wind properties received from the transmitting device of the PLC.

12. The system of claim 11, wherein the one or more wind properties includes at least one of: wind speed, wind direction, humidity, temperature, barometric pressure, and air density.

13. The system of claim 11, further comprising:
a third ultrasonic transceiver of a wind sensor configured to transmit a second ultrasonic packet at a third time; and
a fourth ultrasonic transceiver of the wind sensor configured to receive the second ultrasonic packet at a fourth time, wherein
the third and fourth ultrasonic transceivers are positioned perpendicular to the first and second ultrasonic transceivers, and
the one or more wind properties are further based on the third time and the fourth time.

14. The system of claim 11, wherein an interface between the wind sensor and the PLC is a physical interface.

15. The system of claim 11, wherein the specific communication topology includes at least one or more first channels configured to transmit a first wind property and one or more second channels configured to transmit a second wind property.

16. The system of claim 11, wherein the specific communication topology indicates a signal type associated with each of the one or more wind properties.

17. The system of claim 11, further comprising:
a receiving device of the PLC configured to receive the one or more wind properties transmitted by the transmitting device of the wind sensor via an interface between the wind sensor and the PLC.

18. The system of claim 11, further comprising:
a receiving device of the turbine controller further configured to receive the one or more wind properties transmitted by the PLC via the physical interface between the PLC and the turbine controller.

19. The system of claim 11, further comprising:
a receiving device of the PLC configured to receive one or more signals from the turbine controller via the physical interface between the PLC and the turbine controller, wherein the one or more signals are indicative of an online or offline status of the wind turbine, wherein
the processing device of the PLC is further configured to modify the processed one or more wind properties based on the received one or more signals prior to transmission to the turbine controller.

* * * * *